United States Patent [19]
Galloway et al.

[11] Patent Number: 5,229,952
[45] Date of Patent: Jul. 20, 1993

[54] CONTROL FOR INJECTION MOLDING MACHINE

[75] Inventors: Keith R. Galloway, West Chester; Michael W. Rothwell, Cincinnati; Charles N. Messerle, Lebanon, all of Ohio

[73] Assignee: Cincinnati Milacron Inc., Cincinnati, Ohio

[21] Appl. No.: 644,064

[22] Filed: Jan. 18, 1991

[51] Int. Cl.⁵ .................... G06F 15/46; G05B 19/02
[52] U.S. Cl. .................... 364/476; 364/141; 364/180; 364/473; 425/135
[58] Field of Search ............. 364/473, 476, 135, 141, 364/143, 180; 425/135

[56] References Cited

U.S. PATENT DOCUMENTS

| | | | |
|---|---|---|---|
| 3,840,312 | 10/1974 | Paulson et al. | 425/149 |
| 3,920,367 | 11/1975 | Ma et al. | 425/149 |
| 3,939,329 | 2/1976 | Doran | 235/151.1 |
| 4,486,830 | 12/1984 | Taylor et al. | 364/146 |
| 4,745,541 | 5/1988 | Vaniglia et al. | 364/141 |
| 5,062,052 | 10/1991 | Sparer et al. | 364/473 |

Primary Examiner—Joseph Ruggiero
Assistant Examiner—Paul Gordon
Attorney, Agent, or Firm—John W. Gregg

[57] ABSTRACT

A control for an injection molding machine is provided including: a processor module producing set point signals in response to detection of coincidence of, selectably, analogue input signals, binary status signals, and elapsed time signals; and, a signal processing module for periodically producing control signals in response to the set point signals, measured parameter signals and control algorithms relating set point values and measured parameter values. A DC output interface module is provided including a plurality of DC output interface circuits for applying binary control signals to machine devices. The DC output interface circuits include self-latching over-current protection including means for sensing a latched condition thereof to produce an over-current fault indicating signal available to the processor module. The processor module includes an expansion bus for connection of the signal processing module and the DC output interface module.

17 Claims, 5 Drawing Sheets

CONTROL FOR INJECTION MOLDING MACHINE

BACKGROUND OF THE INVENTION

I. Field of the Invention

This invention relates generally to computer controls for machines. In particular, this invention relates to computer controls for injection molding machines.

II. Description of the Prior Art

It is known from U.S. Pat. No. 4,486,830 to provide a programmable logic controller (PLC) executing high level language programs by means of interpreter routines. The disclosure of this reference describes programming of cycles defined by blocks providing logical and mathematical expressions relating input and output variables associated with bit and word data representing, respectively, device conditions and parameter values.

It is known from U.S. Pat. No. 4,745,541 to provide an injection molding machine control wherein a PLC is combined with a programmable process control module for effecting closed loop control over machine mechanisms. In this reference, the programmable process control is connected to the PLC via the PLC system bus. Further, it is known from this reference to provide event detectors to continuously monitor selected analogue input signals representing controlled parameters and detect coincidence thereof with predetermined values to initiate execution of a programmed response. The event detectors of this reference were limited to use of selected analogue inputs, precluding the use of the event detectors in association with machine operations not represented by the analogue input signals.

It is known from, for example, the CAMAC injection molding machine control available from Cincinnati Milacron Inc., the assignee of the present invention, to provide event detector programming for a PLC wherein the event detectors operated with analogue inputs derived from analogue input interface modules connected to the PLC input/output (I/O) signal bus. Such controls were not supplied with programmable process control modules for effecting closed loop control but relied on analogue loop control interface modules.

The known injection molding machine controls described in the foregoing do not provide a control for injection molding machines wherein the programmability of a PLC is combined with a programmable servo control and event detectors responsive to events reflected by binary status signals and elapsed time signals as well as analogue input signals.

SUMMARY OF THE INVENTION

It is an object of the present invention to provide a control for an injection molding machine having a signal processing module responsive to set point signals for providing programmable servo control of machine devices and having a processor producing set point signals in response to detecting coincidence of selected analogue, binary status, and elapsed time signals with predetermined conditions.

It is a further object of the present invention to provide a control for an injection molding machine having a signal processing module for providing servo control of machine devices by periodically producing control signals in response to set point signals, measured parameter signals and predetermined algorithms relating the set point signals and the measured parameter signals and having a processor producing set point signals in response to detecting coincidence of selected analogue, binary status, and elapsed time signals with predetermined conditions.

It is a still further object of the present invention to provide a control for an injection molding machine having a signal processing module responsive to set point signals for providing programmable servo control of machine devices and having a processor module executing event detector programs to produce set point signals in response to detecting coincidence of selected analogue, binary status, and elapsed time signals with predetermined conditions.

It is a still further object of the present invention to provide a control for an injection molding machine having a processor module including an expansion bus, a signal processing module for providing servo control of selected machine devices connected to the processor module through the expansion bus and a DC output interface module providing over-current protection circuitry connected to the processor module through the expansion bus.

In accordance with the aforesaid objects, a control for an injection molding machine is provided having a processor module for executing machine control application programs and including an expansion bus. The processor module includes a processor producing set point signals in response to execution of machine control programs including event detector programs. The set point signals define desired operation of machine devices. The event detector programs detect coincidence of selected binary status signals, analogue input signals and elapsed time signals with predetermined values marking occurrence of events in machine operation. A programmable signal processor module for effecting servomechanism control of selected machine devices is connected to the processor module through the expansion bus. The signal processing module includes analogue interfaces for periodically producing analogue input signals representing values of measured parameters affected by operation of machine devices. The signal processing module periodically produces control signals in response to selected set point signals received from the processor module and selected analogue input signals in accordance with predetermined algorithms relating the set point values and the measured parameter values. A DC output interface module for applying binary control signals to selected machine devices is connected to the processor module through the expansion bus. The DC output interface module includes over-current protection circuitry for detecting an excess load current and switching off the module outputs in response thereto.

Further objects and advantages of the present invention shall become apparent from the accompanying drawings and the description thereof.

DETAILED DESCRIPTION OF THE PREFERRED EMBODIMENT

To illustrate the present invention, an injection molding machine control developed by Cincinnati Milacron Inc., the assignee of the present invention, shall be described in detail. While this control constitutes a preferred embodiment of the invention, it is not the intention of applicants to limit the scope of the invention to the particular details of this control. Rather, it is the intention of the applicants that the invention be defined by the appended claims and all equivalents thereto.

Injection Molding Machine

Figure 1:
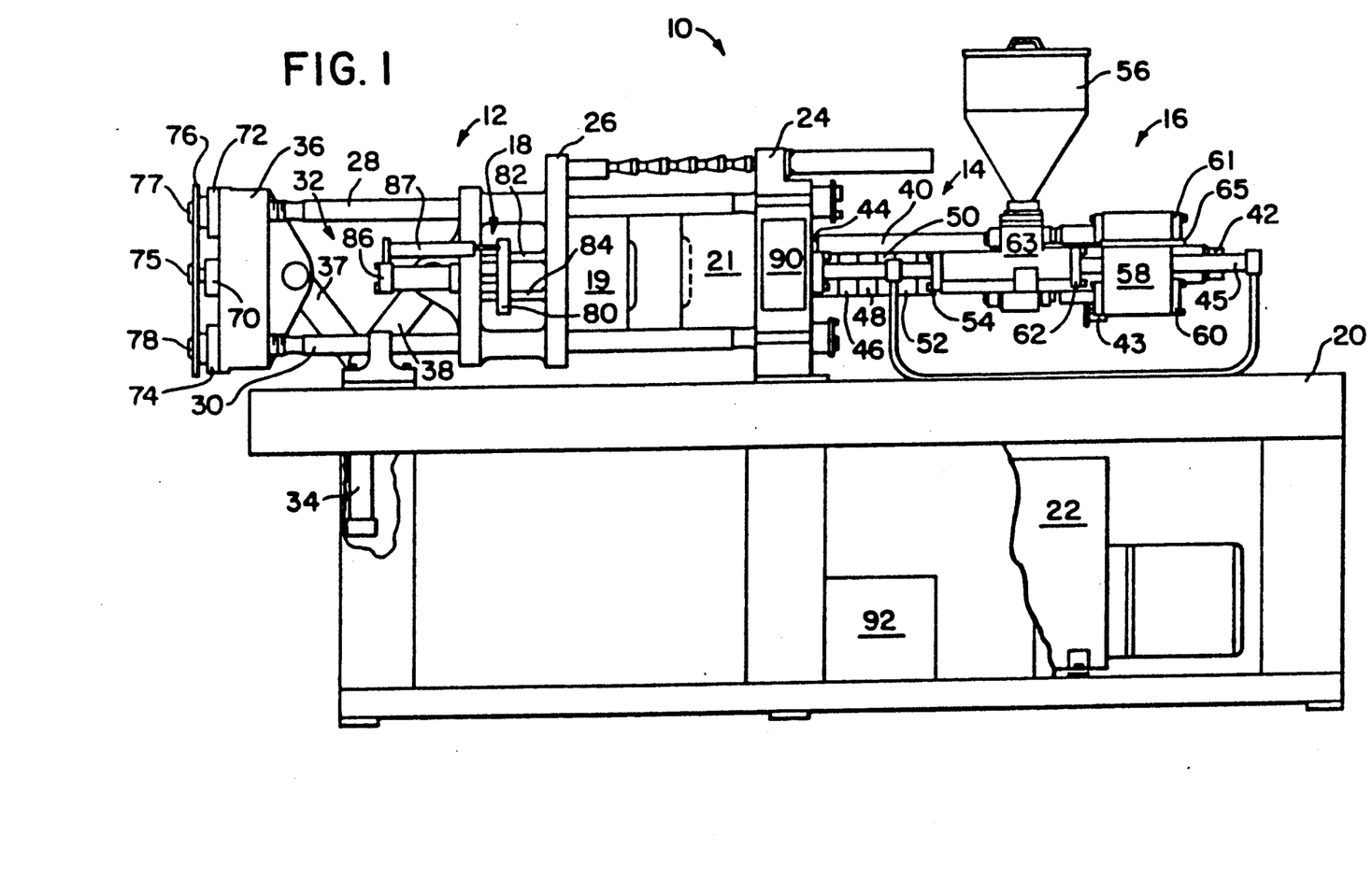
FIG. 1 is side view of an injection molding machine.

FIG. 1 is a side view of an injection molding machine 10 including a clamp mechanism 12, an extruder 14, an injection unit 16, and an ejector 18. Molded articles are formed of a plasticized material injected into a mold cavity formed by mating die components 19 and 21 cooperatively operated by clamp mechanism 12. Each of the machine mechanisms may be operated by hydraulic actuators or the like supplied with pressurized hydraulic fluid from a pump and tank unit 22 mounted within machine frame 20.

Continuing with reference to FIG. 1, clamp mechanism 12 includes a fixed platen 24, fixedly mounted to machine frame 20 and a movable platen 26 slidably mounted on four tie bars including bars 28 and 30 shown in FIG. 1. Reciprocation of movable platen 26 is effected by a toggle mechanism 32 operated by hydraulic cylinder 34. Toggle mechanism 32 imparts a force on movable platen 26 by a series of toggle linkages including links 37 and 38 shown in FIG. 1, pivoting relative to fixed die height platen 36. When links 37 and 38 are aligned parallel to the machine frame, the toggle mechanism is mechanically locked against reaction forces acting on movable platen 26 as a result of injection of material into the mold cavity. Reciprocation of movable platen 26 opens and closes a mold cavity defined by mating die components 19 and 21.

Extruder 14 plasticizes material to be injection molded by a combination of heating and material working as is well known. Extruder 14 includes a barrel segment 40 having a longitudinal bore therethrough containing a plasticizing screw (not shown) rotated by extruder motor 42. As the screw is rotated the material is worked resulting in material self heating. External heater bands 46 through 54 are affixed to the exterior of barrel segment 40 to assist in controlling the temperature of the plasticized material within extruder 14. Material to be plasticized is loaded into extruder 14 via hopper 56. A nozzle 44 is fitted to barrel segment 40 at the exit end thereof. Nozzle 44 includes a nozzle tip for insertion into a communicating passage in fixed platen 24 providing a path for injection of plasticized material into the mold cavity. Nozzle 44 is equipped with a shutoff valve for controlling the emission of plasticized material from barrel 40.

To effect injection of plasticized material into the mold cavity, the extruder screw is advanced longitudinally within barrel 40 in the direction of fixed platen 24. A predefined volume of plasticized material is thereby forced into the mold cavity. Reciprocation of the extruder screw is effected by longitudinal movement of injection unit ram 58, to which extruder motor 42 is mounted, relative to pull-in unit 63 to which barrel segment 40 is mounted. Both injection unit ram 58 and pull-in unit 63 are slidably supported by a pair of opposed injection unit guide rods mounted to fixed platen 24 including injection unit guide rod 45 shown in FIG. 1. Movement of injection unit ram 58 is accomplished by a pair of hydraulic cylinders 60 and 61 having pistons fixed to pull-in unit 63. Reciprocation of the entire injection unit 16 is accomplished by a pair of opposed pull-in unit hydraulic cylinders fixed to pull-in unit 63, including cylinder 62 shown in FIG. 1. Pistons of the pull-in unit hydraulic cylinders are fixed to the injection unit guide rods. Retraction of the injection unit permits retraction of the extruder nozzle from the fixed platen to effect breakage of sprue at the passage in fixed platen 24 and to permit changing of nozzle 44.

A portion of the gap between fixed platen 24 and movable platen 26, known as die height, may be adjusted to accommodate thickness of mold components 19 and 21. Die height is adjusted by rotating tie bar nuts threaded to the tie bar ends projecting through die height platen 36, including nuts 72 and 74 shown in FIG. 1. The resulting translation of die height platen 36 alters the location of clamp mechanism 12, including movable platen 26, relative to fixed platen 24. Rotation of tie bar nuts is effected by drive motor 70 through a sprocket 75 engaging chain 76 wrapped around nut sprockets including sprockets 77 and 78.

To insure removal of finished articles from the mold cavity, ejector 18 is mounted to movable platen 26. Ejector plate 80 is slidably mounted on guide rods including rods 82 and 84 shown in FIG. 1 and reciprocated by a pair of ejector hydraulic cylinders including cylinder 86. Ejector push rods (not shown) are affixed to ejector plate 80 and operate through passages in movable platen 26 to cooperate with ejector pins assembled in die component 19.

An operator station 90 including a keyboard and display is mounted to fixed platen 24. Operator station 90 permits an operator to intervene in operation of the machine and monitor machine performance. Operation of the machine is controlled by programs executed by a machine control 98 contained in cabinet 92 located in frame 20. Data used in the execution of the programs, including set point values for controlling the operation of the machine mechanism actuators and the heaters, may be entered via operator station 90.

Machine Control

A block diagram of the machine control shall be described with reference to FIG. 2. Control 98 includes a processor module 110 to which are connected interface modules such as, for example, output interface module 102, input interface module 106, and signal processing module 104. Processor module 110 executes machine control application programs 160 which define a machine cycle of operation for production of molded articles. In addition, processor module 110 executes user application programs 140 to perform functions associated with selected peripheral devices such as creation of display data for display 94.

Servo control of operation of the mechanism actuators and of the application of power to the extruder heaters is performed by signal processor module 104 in response to set point signals produced by processor module 110 by execution of application programs 160. As applied to injection molding machine 10, signal processing module 104 produces valve control signals and heater control signals by execution of control algorithms relating proportional, integral, and derivative (PID) terms of measured parameters and a suitable control parameter. In the case of valve control, valve spool position commands are produced in response to, for example, controlled device position or velocity as well as applied hydraulic pressure. Position may be measured by, for example, potentiometers and the like, such as position sensing rotary potentiometer 161 shown in FIG. 2 which measures toggle link position from which position of movable platen 26 is derived. Other position transducers include linear potentiometer 87 shown in FIG. 1 for measuring position of injector plate 80 and linear potentiometer 65 shown in FIG. 1 for measuring position of injection ram 58. Velocity may be derived from measured position or measured by, for example, tachogenerators such as tachogenerator 43 measuring extruder screw angular velocity. Hydraulic pressure may be measured by pressure transducers such as transducer 23 measuring pressure at the output of proportional valve 170. In the case of heater control, heater power commands are produced in response to measured temperatures produced by, for example thermocouples and the like, such as thermocouples 162 through 169 shown in FIG. 2 and which may be located within barrel segment 40 proximate heater bands 46 through 54.

Operation of devices associated with machine 10 which are controlled by binary control signals, i.e., ON/OFF control signals, is effected through output interface modules such as, for example, DC output interface module 102. Binary status signals may be produced in response to the binary control signals applied to output interface modules as well binary input signals produced by devices connected to binary input interfaces such as, for example, DC input interface module 106. Each of the modules 102, 104, and 106 are electrically connected to processor module 110 via connectors comprising mating plug and socket pairs such as pairs 100A, 100B, and 100C making up an expansion bus 100 over which are conducted data, address and bus control signals. Expansion bus 100 conforms to the Industry Standard Architecture bus definition and applicants have elected to include sufficient connector sockets on processor module 110 to accept up to ten modules in expansion bus 100.

Machine control application programs 160 and user application programs 140 are stored in memory 116. These programs are executed by microprocessor 112 under control of operating system programs recorded in read-only-memory (ROM) 142. Applicants have chosen the 80386sx microprocessor available from Intel Corporation for microprocessor 112. Data is transferred between the internal data bus of microprocessor 112 and memory 116 directly over local data bus 118. Memory data addresses are transferred over memory address bus 122 and latched at address latch 120. Memory address bus 122 and data and address lines of the expansion bus are controlled by bus controller 114. All data exchanges between microprocessor 112 and expansion bus 100 are performed through bus controller 114. Applicants have selected the 82C386 SX bus controller available from Chips and Technologies, Inc. for bus controller 114. Bus controller 114 produces control signals for controlling the transfer of data over expansion bus 100, provides buffering of a data bus signals produced by microprocessor 112, and incorporates: an interrupt controller; a real time clock generator; a direct memory access controller; a programmable interval timer; interface logic for an 80387sx numeric coprocessor; and, interface logic for an 8042 keyboard controller.

Keyswitch signals produced by keyboard 96 are interfaced to processor module 110 by a serial link connected to keyboard controller 128. Applicants have chosen the 8242 programmable keyboard controller available from Intel Corporation as keyboard controller 128. This device receives keyboard data in serial form and makes the keyboard data available at an eight bit data bus tied to the bus controller. As keyboard characters are received, keyboard controller 128 produces a data available interrupt request signal indicating keyswitch data is available for transfer. Applicants have provided for periodic verification of communication with keyboard controller 128 and operator station 90 by transmission of a predetermined character to keyboard controller 128 to be "echoed". When the echo character is available for transmission by keyboard controller 128 a data available interrupt request signal is generated. Keyboard controller 128 includes a parallel input bus connected to a jumper block (not shown) used in association with system installation and maintenance to provide input signals affecting execution of programs by microprocessor 112.

Display 94 is a back-lighted liquid crystal display organized as 320 rows and 200 columns of display elements. Display data is output by display controller 134 to the display 94 through data signal buffers 130. Applicants have selected the 82C426 LCD/CRT controller available from Chips & Technologies, Inc. as display controller 134. Display data defining the state of each element of display 94 is generated by execution of user application programs 140. The display data is copied into display memory 132 from the expansion bus data lines under control of display controller 134. Display data is transferred to display 94 four bits at a time over four parallel lines under control of display controller 134.

Data communication to external devices such as a programming unit (not shown) is achieved by communication interface 136 effecting transfer of data by, for example, serial communication. Applicants have chosen the 82C601 peripheral controller available from Chips & Technologies, Inc. as the communication interface 136. Communication interface 136 generates a data request interrupt request when data is to be transmitted to the connected device in response to the connected device being in a condition to receive data and a data available interrupt request in response to the availability of data received from the external device. Data are exchanged between communication interface 136 and bus controller 114 over the data lines of expansion bus 100.

As will be appreciated from the foregoing, data communication between microprocessor 112 and the other components of processor module 110 is effected over a combination of local data and address busses and the address and data busses of expansion bus 100. Microprocessor 112 includes a 24 bit address bus and a 16 bit data bus. The address bus of microprocessor 112 is buffered by address transceivers 124 to generate address signals for expansion bus 100. Bus controller 114 produces 8 bit memory addresses for address bus 122 from addresses received over the unbuffered address bus. A 16 bit data bus of bus controller 114 is buffered by data bus transceivers 126 to produce the data lines of expansion bus 100.

Operating system programs executed by microprocessor 112 include event detector programs 144, data acquisition programs 146, background programs 148, diagnostic programs 152, machine control interpreter programs 154 and user processor programs 158. Event detector programs 144 control continuous monitoring of selected signals and programmed responses to detection of predetermined (trigger) conditions of those signals. Data acquisition programs 146 control periodic sampling of selected input signals for use in performing process monitoring under control of the machine control application programs. Diagnostic programs provide power on diagnostics of control system components, initialization of selected data values and initiation of system program execution. Background programs 148 provide data interfaces for user application programs as well as management of real time clock data produced by bus controller 114.

Signal Processor Module Interface

Signal processor module 104 provides servo-control in response to set point signals defining desired operation of machine devices, selected analogue input signals representing actual conditions affected by the controlled devices, and programmed control algorithms relating selected set point signals and selected analogue input signals. Signal processing module 104 performs loop control algorithm calculations at a predetermined loop closure interval. It will be recalled that signal processor module 104 is connected to processor module 110 by means of expansion bus 100. Data to be exchanged between signal processor 104 and processor module 110 are written to locations in a dual port memory resident on signal processor module 104. Data transfers through the dual port memory are organized as multiple word vectors exchanged under control of the machine control interpreter programs 154 executed by processor module 110. The vectors include: (a) an analogue configuration vector providing gain constants for valve control algorithms, ramp function constants and analogue processing mode commands; (b) a digital configuration vector providing gain constants for temperature control algorithms and temperature loop processing mode commands; (c) an input register vector providing digital representations of analogue inputs and measured temperatures; and, (d) an output register vector including servo control set-point values for valve control and temperature control. Signal processing module 104 reads output register vector data and writes input register vector data at the loop closure interval.

As previously described, signal processing module 104 receives measured parameter signals produced by transducers for use in execution of the control algorithms. Signal processing module 104 includes input interfaces for these analogue input signals, converts the analogue input signals to digital representations thereof and uses the digital representations in the execution of control algorithms by the digital signal processor. Further, signal processor module 104 makes the digital representations of the analogue inputs available to processor module 110 in the input register vector exchanged through the dual port memory.

Control Operation

Figure 2:
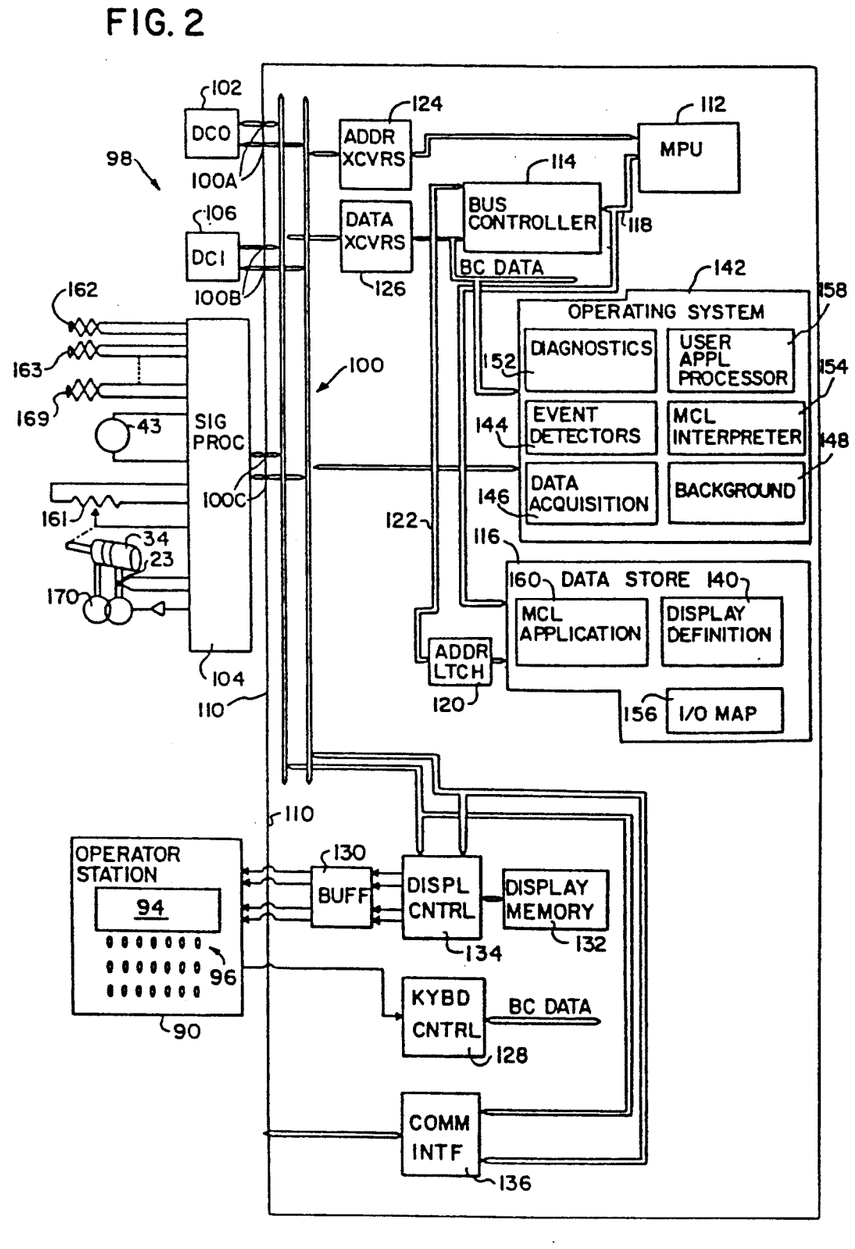
FIG. 2 is a block diagram of the control of the present invention.
Figure 3A:
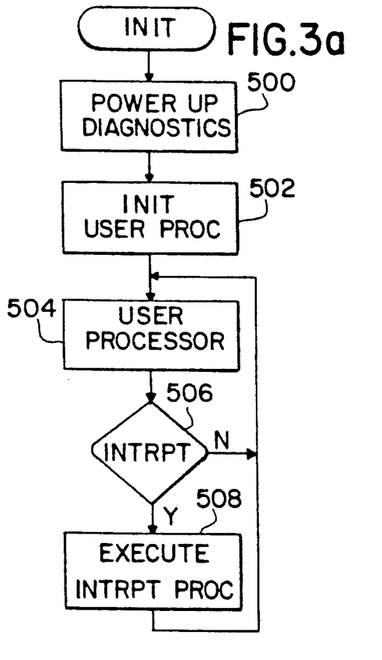
FIGS. 3a, 3b, 3c, 3d, 3e, 3f, and 3g are flow charts depicting procedures executed by the control of FIG. 2 to control operation of the machine of FIG. 1.

The operating system routines identified in the control block diagram of FIG. 2 manage the transfer of data between components of the control and effect the execution of machine control application programs and user application programs performing the control functions of the machine cycle of operation. Operating system routines shall be described with reference to FIGS. 3a, 3b, 3c, 3d, 3e, 3f, and 3g. Operating system routines are executed generally in accordance with the procedure illustrated by the flow chart of FIG. 3a. Upon application of power to processor module 110, power-up diagnostic routines are executed at step 500. Functions performed by the power-up diagnostic routines include: memory backup battery test; memory diagnostics; execution of the selftest of keyboard controller 128; verification of data read and data write functions with communication interface 136; and, testing of a time-of-day clock output produced by bus controller 114. Upon completion of successful execution of diagnostics associated with the components of processor module 110, diagnostic routines associated with modules connected to the expansion bus are performed and diagnostic routines associated with the operation of operator station 90 are performed. Thereafter, initialization routines are executed to establish initial values of timers associated with the machine control scan processing and event detector processing. Execution of the flow chart of FIG. 3a continues with an execution of user processor initialization routines at step 502.

Following completion of execution of the power-up procedures associated with steps 500 and 502, execution of the user processor routines is initiated at step 504. Execution of user processor routines is performed continuously until interrupted by interrupt signals associated with the other primary functions of the operating system programs. Interrupt requests generated by processor module components as well as timed interrupts are processed by the interrupt controller of bus controller 114 to produce a single interrupt signal to microprocessor 112. Bus controller 114 provides the starting address of the appropriate interrupt service routine to microprocessor 112. Occurrence of an interrupt signal is detected at decision step 506 and the procedure identified by the address provided by bus controller 114 is executed by process step 508. Upon completion of execution of the interrupting procedure, execution of the user processor routines is resumed as indicated by the return line of the flow chart of FIG. 3a immediately preceding step 504.

Figure 3B:
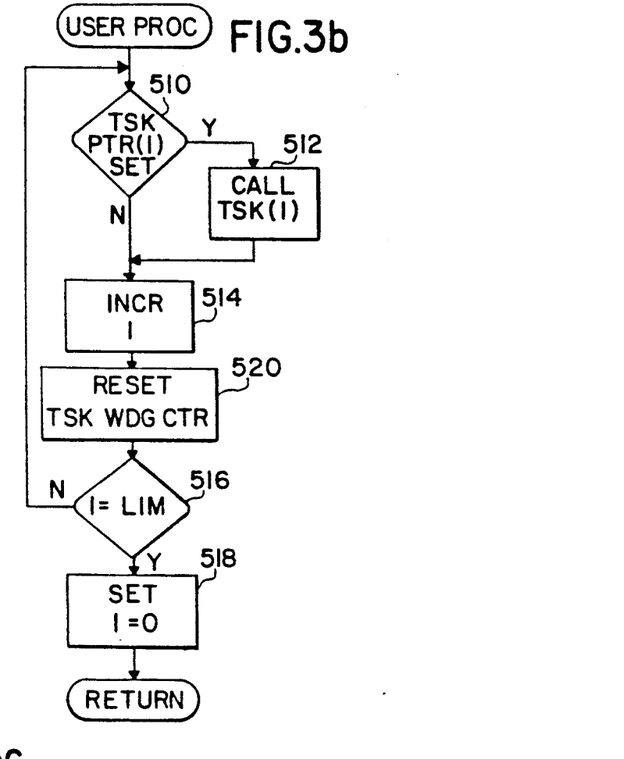

User processor routines 158 initiate execution of user application programs and monitor the execution thereof by means of a watchdog timer. Each application has associated therewith two task pointers, one directing execution of task initialization routines and the other directing execution of task background routines. Execution of the user application initialization routines effects setting of the task pointer to direct execution of user application background routines. Thereafter, each call of user application routines effects the execution of the user application background routines. Task pointers to user application initialization routines are set with execution of the user processor initialization at process step 502. Referring to FIG. 3b, a selected task pointer is read at process step 510. If the task pointer value is zero, the routines associated with the selected task pointer are not executed. If the task pointer value is not zero, execution of the associated routines is called at process step 512 from an address determined from the task pointer. Upon completion of execution of the user application programs, execution of the user processor programs 158 is resumed at process step 514 where the task pointer index I is incremented. At process step 520 a task watchdog counter is reset. The task watchdog counter enables monitoring of the duration of execution of user processor routines. At decision step 516, it is determined whether or not the task pointer index is equal to a limit value. If it is, the task pointer index is set equal to zero indicating that all of the user application programs associated with each of the tasks identified through the task pointer have been executed. Thereafter, execution of the user processor programs continues at decision step 510 pending the occurrence of an interrupt as described with reference to FIG. 3a. If it is determined at decision step 516 that the task pointer index were not equal to the limit value, process step 518 is skipped and execution continues at decision step 510. In applicants' preferred embodiment, the user processor programs provide for the execution of up to four independent user applications or tasks. In one embodiment, the sole user application produces data to be displayed on the display 94 of operator station 90.

Each operating system function to be performed in response to occurrence of an interrupt signal is assigned a priority level to determine the order in which interrupt processing is to occur. The highest interrupt priority level is assigned to a system timer interrupt occurring at a fixed interval of two milliseconds. Processing of event detector routines and data acquisition routines is performed in response to occurrence of the system timer interrupt signal.

Figure 3C:
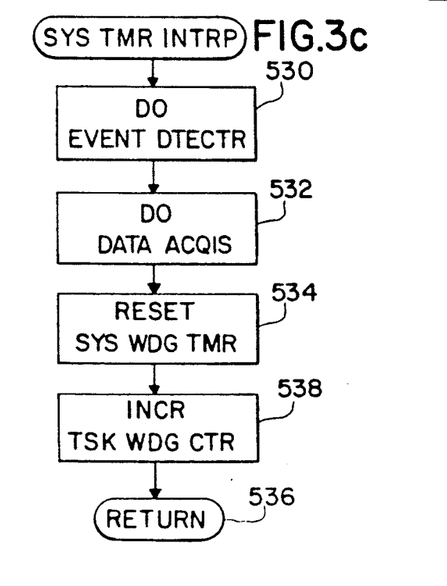

Referring to FIG. 3c event detector processing is called at process step 530. Event detector routines control continuous monitoring of selected signals to determine the occurrence of an event reflected by coincidence of a selected signal with a predetermined (trigger) value. The selected input may include a digital representation of: output signals produced in the course of execution of application programs 160 including binary control signals and internal variable values associated with machine and control conditions; input signals including analogue input signals processed by signal processing module 104, and binary input signals received via input interface module 106; and timing signals generated in the course of execution of the event detector programs. A programmed sequence, typically including a change of state of one or more output signals, is executed in response to detection of the trigger event. The programmed sequence may effect immediate transmission of set point values to signal processor module 104, changes of state of output signals at, for example, DC output interface module 102, initiation of execution of additional event detector sequences or initiation of measurement of elapsed time by timers implemented in the event detector programs 144. Applicants have provided for up to four simultaneously active event detectors, each active event detector being processed with every occurrence of the system timer interrupt. An overall description of event detection processing shall be provided hereinafter.

Upon completion of execution of event detector processing, data acquisition routines are executed at process step 532. Data acquisition enables periodic sampling of selected input signals and storage of the sample values for access by the machine control application programs. The period of sampling is programmable and the maximum number of samples taken is predetermined. Upon completion of execution of the data acquisition routines, a system watchdog timer is reset by process step 534. The system watchdog timer is used to monitor the time during which microprocessor 112 is engaged in execution of routines. In the event the watchdog timer is not reset, a time-out condition will be detected indicative of a fundamental system failure requiring maintenance. At process step 538 the task watchdog counter reset by the user processor is incremented. In the event of failure of the user processor to reset the task watchdog counter, the counter will be incremented to a limit value indicating failure of the task processor and an error status will be set. Execution of the user application processing routines is resumed via the return through terminal 536.

Figure 3D:
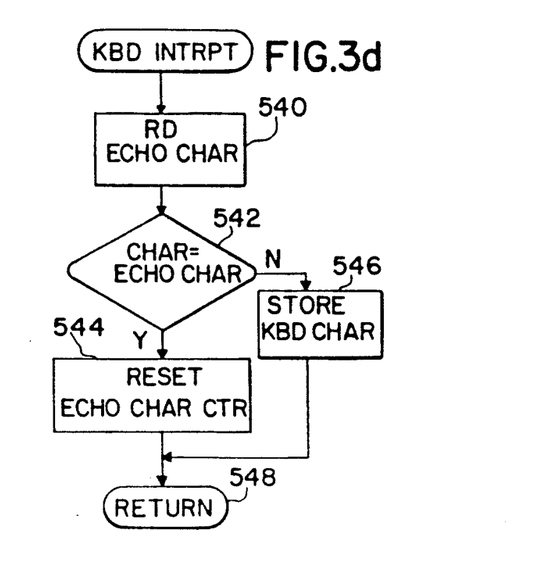

The second highest interrupt priority level is assigned to interrupt signals generated by keyboard controller 128. Interrupt requests are generated by keyboard controller 128 upon availability of data for transfer. Referring to FIG. 3d, at process step 540 the keyboard controller data is read. At decision step 542 it is determined whether the keyboard data is the echo character transmitted for verification of communication with keyboard controller 128. If it is an echo character counter is reset at process step 544. Thereafter, execution of the user application processor routines is resumed via the return through terminal 548. If it is determined at decision step 542 that the character read is not the echo character, the character available at the output of keyboard controller 128 is stored at process step 546 in a memory location for access by the machine control application programs and user application programs. Thereafter, execution of the user application processor routines is resumed via the return of terminal 548.

Figure 3E:
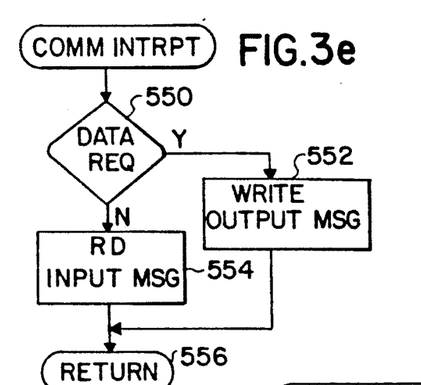

The third highest interrupt priority level is assigned to interrupt signals produced by communication interface 136. Communication interface 136 produces an input data interrupt request upon availability of input data at the data bus terminal of communication interface 128. Communication interface 136 produces an output data interrupt request when data is to be transmitted to a connected device and the connected device is in a condition to receive data. Referring to FIG. 3e, if execution of an output data routine has been selected as indicated by the "Y" side of decision step 550, output data is written to communication interface data bus terminal at process step 552. If the input data interrupt routine is selected as indicated by the "N" of decision step 550, input message data is read from data bus terminal of communication interface 128 at process step 554. Upon completion of, alternatively, process step 552 and process step 554, execution of the user application processing routines is resumed via the return through terminal 556.

Figure 3F:
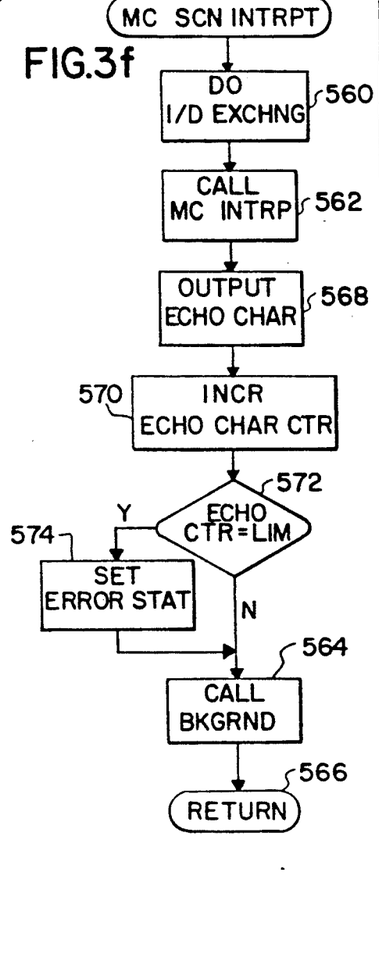

The fourth highest interrupt priority level is assigned to the machine control scan interrupt signal which is generated at a programmable period associated with execution of the machine control application processing routines. Referring to FIG. 3f, upon occurrence of a machine control scan interrupt signal, exchange of data between the input and output interface devices and the machine control interface data area is affected by process step 560. Digital representations of binary status signals are produced in association with the input/output interface data exchange. At process step 562, the machine control application program interpreter is called. The interpreter programs 154 control execution of the machine control application programs 160. A description of the functions of the machine control application program interpreter is provided in U.S. Pat. No. 4,486,830. Following completion of execution of the machine control application interpreter programs, the echo character is output to keyboard controller 128 at process step 568. At process step 570 the echo character counter is incremented. The echo character counter is, in normal operation, reset by the keyboard controller interrupt service routine illustrated in FIG. 3d. Decision step 572 determines whether the echo character counter has been incremented to a limit value indicative of repeated failures of the operator station to recognize the echo character. This indicates a communication failure and an error status is set at process step 574. Following execution of the echo character counter test steps, processor module background programs 148 are called at process step 564. Background programs are used to perform functions including: transfer of configuration vector data to signal processor module 104; loading of time-of-day clock data from bus controller 114 to register locations accessible by the machine control application programs and the user application programs; and setting of parameters associated with data acquisition requests generated by execution of the machine control application programs. Upon completion of execution of the background routines, execution of the user application processing routines is resumed via the return of terminal 566.

Figure 3G:
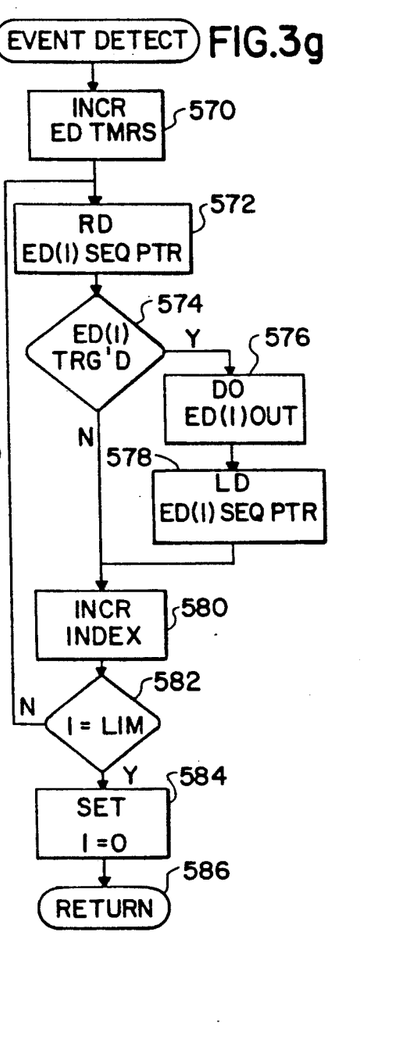

Event detector processing shall be described with reference to FIG. 3g. At process step 570 all active event detector timers are incremented to reflect the passage of the period marked by occurrence of the system timer interrupt. At process step 572 a sequence pointer of a selected event detector is read. The sequence pointer indicates the active sequence of the event detector selected by the event detector select index I. At decision step 574 it is determined whether the trigger event associated with the active sequence of the selected event detector has occurred. The active sequence has associated therewith data identifying the signal for comparison and the desired value to which the signal is to be compared. As previously stated the trigger event may be coincidence of a selected analogue input, such as, for example the analogue input associated with position measuring potentiometer 161, with a predetermined value marking, for example, a position of movable platen 26 associated with a desired change of clamp mechanism operation. In this case, the analogue input is compared with a programmed value representing the desired position. Further, a trigger event may be detection of expiration of a predetermined period measured by an active event detector timer. In this case the magnitude of the selected timer is compared with a programmed value defining the desired number of system timer interrupt periods. Alternatively, a trigger event may be detection of a binary status signal having attained a predetermined state. In this case the selected binary status signal is compared with the desired state value.

If the trigger event has occurred, the action programmed to be taken with the active sequence is effected at process step 576. The action may include the output of new set point data to the signal processing module 104 or a change of state of output signals through DC output interface 102. Data defining the output or set point to be affected and the new values are included with the event detector trigger response programming. To effect a change in set point values in response to a triggered event detector, processor 112 writes new set point values in the output register vector exchanged through the dual port memory on signal processor module 104. To effect a change in an output interface in response to a triggered event detector, processor 112 writes new output data to the appropriate device interface. Additionally, the action may affect operation of other event detectors as is described in U.S. Pat. No. 4,745,541. Upon completion of execution of the trigger response, a new value is loaded to the active sequence pointer to indicate the next active sequence of the selected event detector at process step 578.

If it is determined at decision step 574 that the trigger event has not occurred, process steps 576 and 578 are skipped and event detector processing continues at process step 580 where the event detector selection index is incremented. At decision step 582 it is determined whether the event detector selection index equals a limit value equal to the number of permissible active event detectors. If the index is equal to the limit, it is set equal to zero at process step 584 and execution of user application processing routines is resumed via the return through terminal 586. If it is determined at decision step 582 that the event detector selection index is not equal to the limit value, event detector processing continues at process step 572 using the new value of the index to identify the selected event detector. In this fashion, all of the active event detectors are processed for each occurrence of the system timer interrupt thereby enabling changes of set point data to the signal processing module 104 at the rate of occurrence of the system timer interrupt.

DC Output Interface Module

Figure 4:
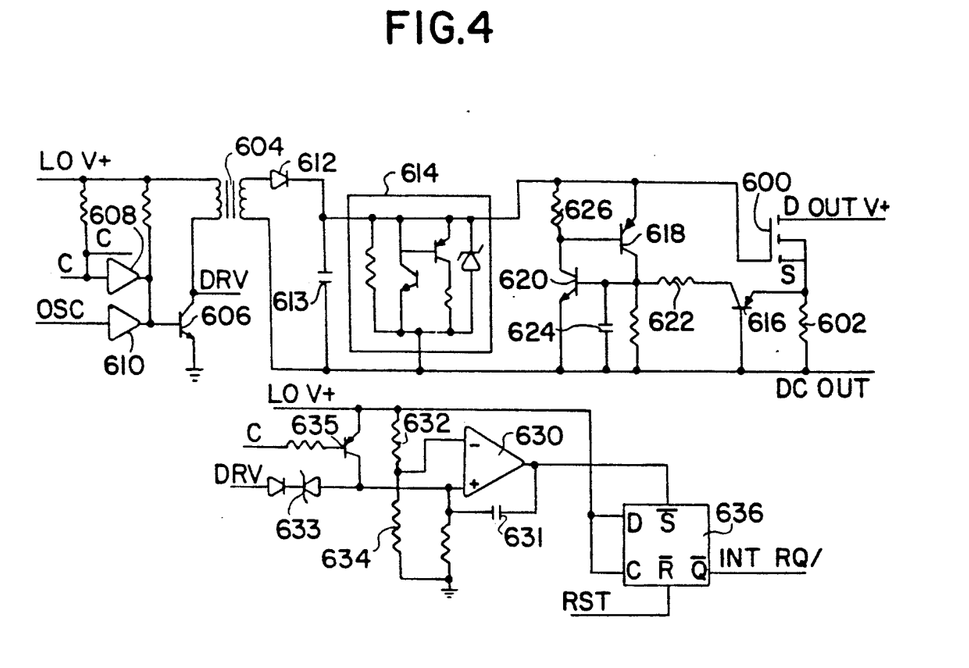
FIG. 4 is a circuit diagram of the DC output interface module of FIG. 2.

In the preferred embodiment, the DC output module 102 provides sixteen DC output interface circuits using MOS field effect transistors as output transistors. These transistors provide high current carrying capability with relatively low power dissipation when compared with convention bipolar power transistors. Consequently, transistor heat sinks are not required for normal operation, thereby reducing the area required for each interface circuit. The output interface circuits include over-current protection circuitry to take the output transistors out of conduction in response to detecting an excessive current being delivered to a load.

An exemplary DC output interface circuit shall be described with reference to FIG. 4. The drain terminal of output transistor 600 is connected to the positive DC output supply voltage. Current sensing resistor 602 is connected between the source terminal of output transistor 600 and the interface circuit output terminal. The load to be driven by the DC output interface circuit is connected between the interface circuit output terminal and a return line providing a return for the DC output power supply. A gate drive signal for output transistor 600 is derived from the signal appearing across the secondary winding of transformer 604. An output interface control signal C is combined with a high frequency pulse train OSC through, respectively, buffers 608 and 610 to produce a drive signal DRV at the output of buffer transistor 606 for the primary winding of transformer 604. Transformer 604 steps up the drive signal by a ratio of 2:1 to produce a gate drive signal nearly equal to half the output supply voltage. The drive signal is half-wave rectified by diode 612 and filtered by capacitor 613 to produce a DC gate drive signal for output transistor 600. The frequency of the pulse train is such that the half-wave rectified gate drive signal will not result in output transistor 600 coming out of conduction during the pulse train period in normal operation. An MOS FET turnoff device 614 is connected between the gate drive signal and its return to effect rapid turn-off of output transistor 600 when the gate drive signal is removed. Applicants have chosen the MD1000B MOS FET turn-off device available from Motorola Inc. as turn-off device 614. Upon removal of gate drive, this device removes charge stored at the gate of output transistor 600 assuring rapid switching of the output transistor to its "OFF" condition.

Continuing with reference to FIG. 4, output transistor 600 is protected against excessive load currents by means of a latch circuit including transistors 618 and 620 responding to an excess current detected at current sensing resistor 602. As the voltage developed across current sensing resistor 602 increases, series pass transistor 616 is brought into conduction. The current conducted by transistor 616 charges capacitor 624 through series resistor 622 at a time constant determined by the values of these components. The time constant is chosen to achieve a desired predetermined period of over-current operation before turning off output transistor 600. Once capacitor 624 has been charged so as to forward bias the base to emitter junction of transistor 620, transistor 620 conducts developing a voltage across resistor 626 forward biasing the base to emitter junction of transistor 618. With transistor 618 turned on, transistor 620 is latched on, resulting in removal of the gate drive signal from output transistor 600 while simultaneously increasing the current delivered by transformer 604. The latched condition of transistor 620 may be overcome only by removing power from the latching circuit. This may be done by setting the interface control signal C to its low condition, thereby preventing switching of transistor 606 in response to the pulse train, eliminating the drive signal at the secondary of transformer 604.

In the preferred embodiment a sensor is provided to detect the occurrence of over-current latching and produce a fault signal output at the expansion bus interface. Comparator 630 compares the magnitude of the transformer primary drive signal DRV with a reference value derived from a voltage divider formed by resistors 632 and 634. Under normal conditions the inductive kickback voltage appearing at the collector of transistor 606 when that transistor is turned OFF is about twice the zener voltage of zener diode 633. This assures that the positive (noninverting) input of comparator 630 is biased above the reference voltage applied to the comparator negative (inverting) input. Under these conditions the output of comparator 630 is high. The increased load on the secondary of transformer 604 resulting from the latched condition of the over-current latch results in a decrease in the inductive kickback voltage appearing at the collector of buffer transistor 606. This decrease is sufficient to reverse the conditions at the inputs of comparator 630 resulting in the comparator output being driven to a low level. The low output of comparator 630 sets the output of flip flop 636 to generate an interrupt request signal. The interrupt request is ultimately conveyed through expansion bus 100 and processed by the interrupt controller of bus controller 114. To insure that the positive input of comparator 630 is more positive than the negative input during periods when the output interface is commanded to be OFF, transistor 636 is switched in response to the output interface control signal C. When the interface control signal C is low, transistor 636 will be ON forcing the positive input of comparator 630 to a value more positive than the negative input. To prevent switching of comparator 630 during the periods when drive signal DRV is low and the interface is commanded to be ON,
capacitor 631 provides the requisite hysteresis at the positive input of comparator 630.

While the control of the present invention is described as including three types of modules connected to the expansion bus, it will be appreciated that by virtue of adoption by applicants of the Industry Standard Architecture bus definition, any module developed for that bus may be connected. It is therefore contemplated that commercial products providing network interfaces, disk drives, memory expansion, and other functions typical of the personal computer industry may be readily added to the control when required. It will be appreciated by those skilled in the art that the use of bus controller 114 in combination with the Industry Standard Architecture bus definition greatly simplifies the task of providing operating software to support the functions provided by these products.

What is claimed is:

1. A method for controlling an injection molding machine including at least one machine device responsive to an analogue control signal and at least one transducer for producing a measured parameter signal representing a machine condition affected by operation of the machine device, the method comprising the steps of:
   a. producing, in response to the measured parameter signal, analogue input signals representing values of the measured machine parameter;
   b. producing binary status signals representing status of selected machine conditions;
   c. producing elapsed time signals representing elapsed periods associated with machine operations;
   d. producing set point signals defining desired operation of a machine device in response to detection of coincidence of values of any of selected analogue input signals, selected binary status signals and selected elapsed time signals with predetermined values marking the occurrence of events associated with machine operation; and,
   e. periodically producing control signals for controlling the machine device, the values of the control signals being calculated at a predetermined loop closure interval in response to the set point signals, selected analogue input signals, and control algorithms relating selected set point values and selected measured parameter values.

2. The method of claim 1 wherein the step of producing set point signals further comprises the steps of:
   a. producing a system timer interrupt signal defining a first predetermined interrupt interval; and,
   b. in response to occurrence of the system timer interrupt signal comparing values represented by any of selected analogue input signals, selected binary status signals, and selected elapsed time signals with predetermined values to detect coincidence therewith.

3. The method of claim 2 wherein coincidence of an elapsed time signal and a predetermined value are to be detected and the step of producing set point signals further comprises the steps of:
   a. incrementing an elapsed time value in response to occurrence of the system timer interrupt signal, the elapsed time value marking the number of occurrences of the system timer interrupt signal from a predetermined event; and
   b. comparing the incremented elapsed time value to a predetermined value.

4. The method of claim 1 wherein the step of producing analogue input signals further comprises the step of periodically sampling the measured parameter signal at the loop closure interval.

5. The method of claim 1 wherein the step of producing binary status signals further comprises the steps of:
   a. periodically producing a scan interrupt signal at a second predetermined interrupt interval; and,
   b. producing binary status signals in response to desired device conditions and actual device conditions determined in accordance with machine conditions existing as of the occurrence of the scan interrupt signal.

6. A control for an injection molding machine including at least one machine device responsive to an analogue control signal and at least one transducer for producing a measured parameter signal representing a machine condition affected by operation of the machine device, the control comprising:
   a. means for producing analogue input signals representing values of the measured machine parameters;
   b. means for producing binary status signals representing status of selected machine conditions;
   c. means for producing elapsed time signals representing elapsed periods associated with machine operations;
   d. a processor for periodically producing set point signals defining desired operation of a machine device in response to detection of coincidence of values of any of selected analogue input signals, selected binary status signals and selected elapsed time signals with predetermined values marking the occurrence of events associated with machine operation; and,
   e. signal processing means for periodically producing analogue control signals for controlling the machine device, the signal processing means calculating values of the control signals at a predetermined loop closure interval in response to the set point signals, selected analogue input signals and control algorithms relating selected set point values and selected measured parameter values.

7. The control of claim 6 wherein the processor further comprises:
   a. means for periodically producing a system timer interrupt signal defining a predetermined time interval;
   b. means responsive to the system timer interrupt signal for incrementing elapsed time values represented by elapsed time signals and marking the number of occurrences of the system timer interrupt signal from predetermined events; and,
   c. means for comparing values represented by any of selected analogue input signals, selected binary status signals, and selected elapsed time signals to predetermined values to detect coincidence therewith.

8. The control of claim 6 wherein the means for producing analogue input signals further comprises means for periodically sampling the measured parameter signal at the loop closure interval.

9. The control of claim 6 wherein the means for producing binary status signals further comprises:
   a. means for periodically producing a scan interrupt signal at a second predetermined interrupt interval; and,
   b. means for producing binary status signals in response to desired device conditions and actual device conditions determined in accordance with machine conditions existing as of the occurrence of the scan interrupt signal.

10. A control for an injection molding machine having a clamp mechanism for cooperatively operating mating die components defining a mold cavity, an injection ram for injecting plasticized material into the mold cavity, and an extruder for plasticizing material to be injection molded, the machine including transducers for producing measured parameter signals representing measured values of machine conditions, the control comprising:
    a. a processor module including an expansion bus, the processor module executing event detector programs to detect coincidence of values of any of selected analogue input signals, selected binary status signals, and selected elapsed time signals with predetermined values and producing in response thereto set point signals; and,
    b. a signal processing module connected to the system processor module through the expansion bus, the signal processing module including means for periodically sampling the measured parameter signals to produce analogue input signals and means responsive to the analogue input signals and the set point signals for periodically producing control signals for controlling operation of the clamp mechanism, the extruder, and the injection ram.

11. The control of claim 10 further comprising an operator station including a display device and a keyboard, the operator station being located remotely from the processor module.

12. The control of claim 10 wherein the processor module further comprises:
    a. a keyboard controller for reading and converting keyboard data produced by the keyboard; and,
    b. a display controller for producing data in a format required by the display device.

13. The control of claim 10 wherein the expansion bus is compatible with the Industry Standard Architecture.

14. The control of claim 10 further comprising a DC output interface module connected to the processor module through the expansion bus and including a plurality of DC output interface circuits responsive to interface control signals and means for inhibiting conduction of current at the output of an interface circuit in response to sensing an excessive load current delivered thereby.

15. The control of claim 14 wherein the interface circuit comprises:
    a. an output transistor for delivering current to a load;
    b. an input buffer for producing an AC drive signal in response to an interface control signal;
    c. rectifying means for producing in response to the AC drive signal a DC drive signal for controlling the output transistor;
    d. means for measuring the current delivered to a load; and
    e. latching means responsive to the measuring means for removing the DC drive signal from the load current delivering transistor and increasing the load presented to the input buffer.

16. The control of claim 15 wherein the interface circuit further comprises means responsive to the load on the buffer for detecting the state of the latching means to produce a fault signal accessible to the processor over the expansion bus.

17. The control of claim 15 wherein the input buffer further comprises:
   a. means for producing a pulse train;
   b. an input switching means;
   c. means for logically combining the interface control signal and the pulse train to control the input switching means; and,
   d. a transformer responsive to the input switching means for producing the AC drive signal.

* * * * *